(12) United States Patent
Geromiller et al.

(10) Patent No.: US 9,797,371 B2
(45) Date of Patent: Oct. 24, 2017

(54) ROTOR BLADE FOR A TURBINE

(71) Applicant: Andritz Hydro GmbH, Vienna (AT)

(72) Inventors: Johannes Geromiller, Fronreute (DE);
Daniel Plessing, Ravensburg (DE);
Carsten Hermann, Weingarten (DE)

(73) Assignee: Andritz Hydro GmbH, Vienna (AT)

( * ) Notice: Subject to any disclaimer, the term of this patent is extended or adjusted under 35 U.S.C. 154(b) by 477 days.

(21) Appl. No.: 14/373,607

(22) PCT Filed: Jan. 17, 2013

(86) PCT No.: PCT/EP2013/000125
§ 371 (c)(1),
(2) Date: Jul. 21, 2014

(87) PCT Pub. No.: WO2013/107639
PCT Pub. Date: Jul. 25, 2013

(65) Prior Publication Data
US 2015/0071784 A1     Mar. 12, 2015

(30) Foreign Application Priority Data

Jan. 20, 2012 (AT) .................................. A 62/2012

(51) Int. Cl.
*F03D 1/06* (2006.01)
*F01D 5/30* (2006.01)
(Continued)

(52) U.S. Cl.
CPC .......... *F03D 1/0658* (2013.01); *F01D 5/3053* (2013.01); *F03B 3/121* (2013.01); *F03B 13/264* (2013.01); *F05B 2260/30* (2013.01); *Y02E 10/223* (2013.01); *Y02E 10/28* (2013.01); *Y02E 10/721* (2013.01)

(58) Field of Classification Search
CPC .......... F01D 5/32; F01D 5/141; F01D 5/3053; F03B 13/364; F03B 3/121; F03D 1/0658; F03D 3/064; F03D 1/0691; F05B 2260/30; Y02E 10/28; Y02E 10/223; Y02E 10/721
See application file for complete search history.

(56) References Cited

U.S. PATENT DOCUMENTS

| 3,310,116 A | 3/1967 | Saeki et al. |
| 4,260,332 A | 4/1981 | Weingart et al. |

(Continued)

FOREIGN PATENT DOCUMENTS

| WO | 02/42638 | 3/2002 |
| WO | 2010/067082 | 6/2010 |

(Continued)

OTHER PUBLICATIONS

European Search Report cited in PCT/EP2013/000125 mailed May 10, 2013.

*Primary Examiner* — Ninh H Nguyen
*Assistant Examiner* — Brian P Wolcott
(74) *Attorney, Agent, or Firm* — Nixon & Vanderhye P.C.

(57) ABSTRACT

An assembly of rotor blades and hub for a turbine, such as a tidal current turbine. Each rotor blade includes a cavity and at least two ribs extending into the cavity at a radially inward (lower) region of the rotor blade. The hub includes a journal for each blade and the journal extends into the cavity and is supported by the at least two ribs.

14 Claims, 9 Drawing Sheets

(51) Int. Cl.
*F03B 3/12* (2006.01)
*F03B 13/26* (2006.01)

(56) References Cited

U.S. PATENT DOCUMENTS

| | | | | |
|---|---|---|---|---|
| 4,773,824 A | * | 9/1988 | Kiss | F03D 1/0658 416/10 |
| 5,173,023 A | | 12/1992 | Pawlowski et al. | |
| 5,660,527 A | * | 8/1997 | Deering | F03D 1/0658 416/204 R |
| 2007/0154317 A1 | | 7/2007 | Cairo | |
| 2007/0264121 A1 | | 11/2007 | Miller | |

FOREIGN PATENT DOCUMENTS

| WO | 2010/084320 | 7/2010 |
|---|---|---|
| WO | 2011/077454 | 6/2011 |

\* cited by examiner

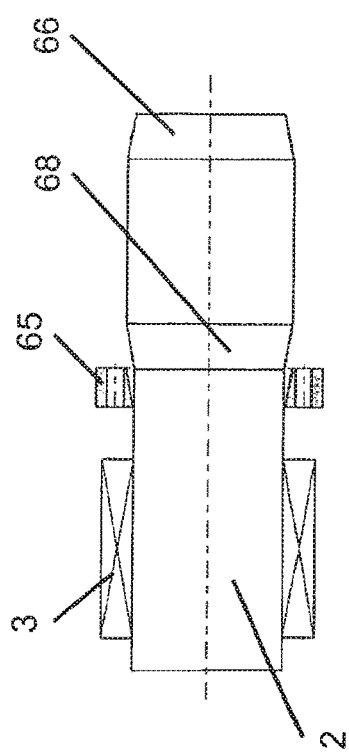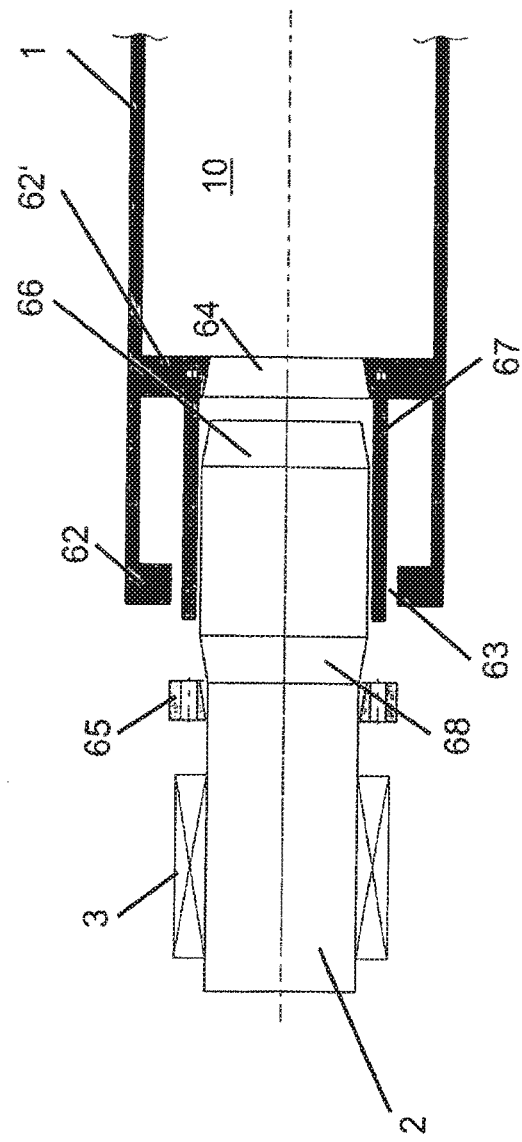

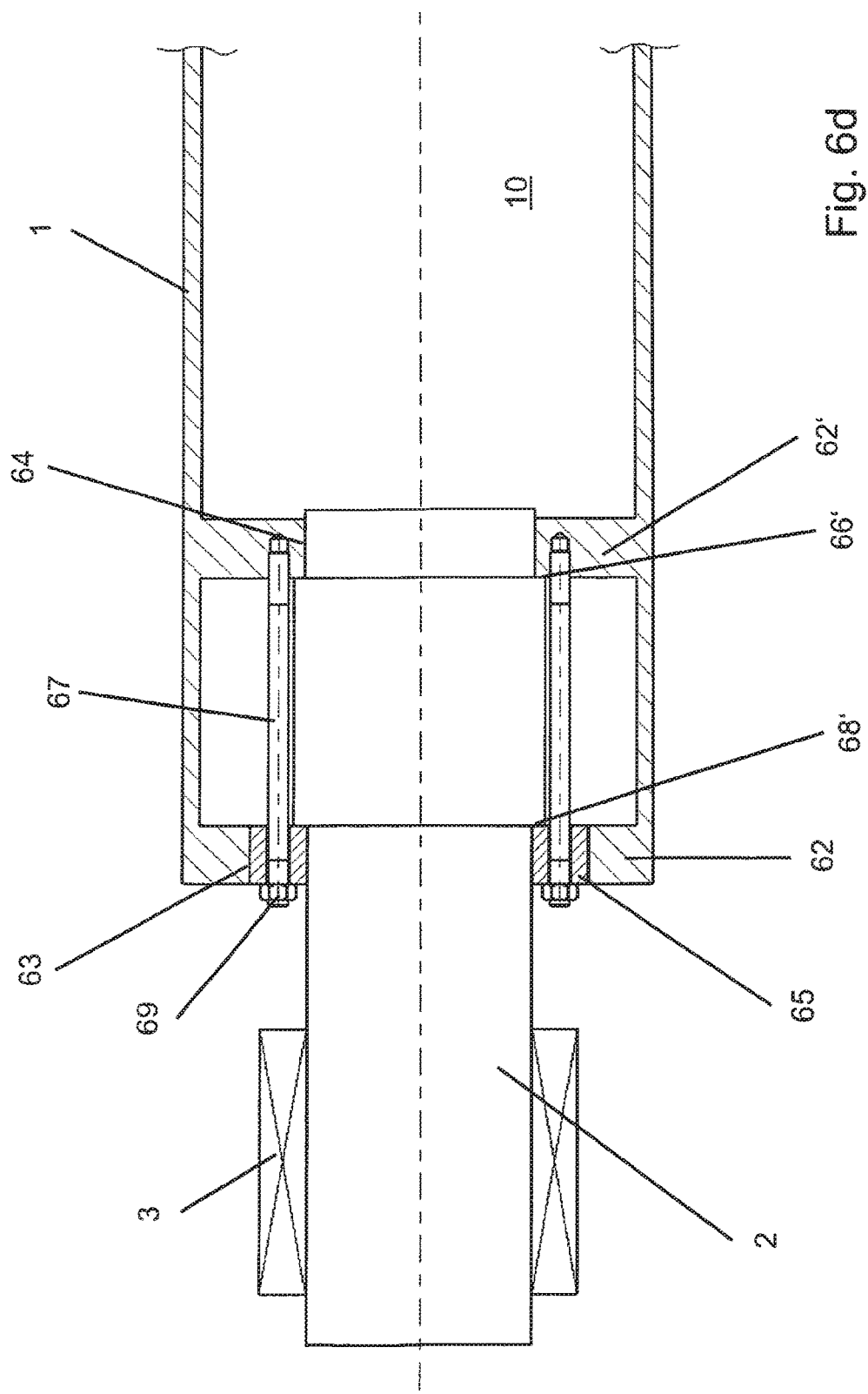

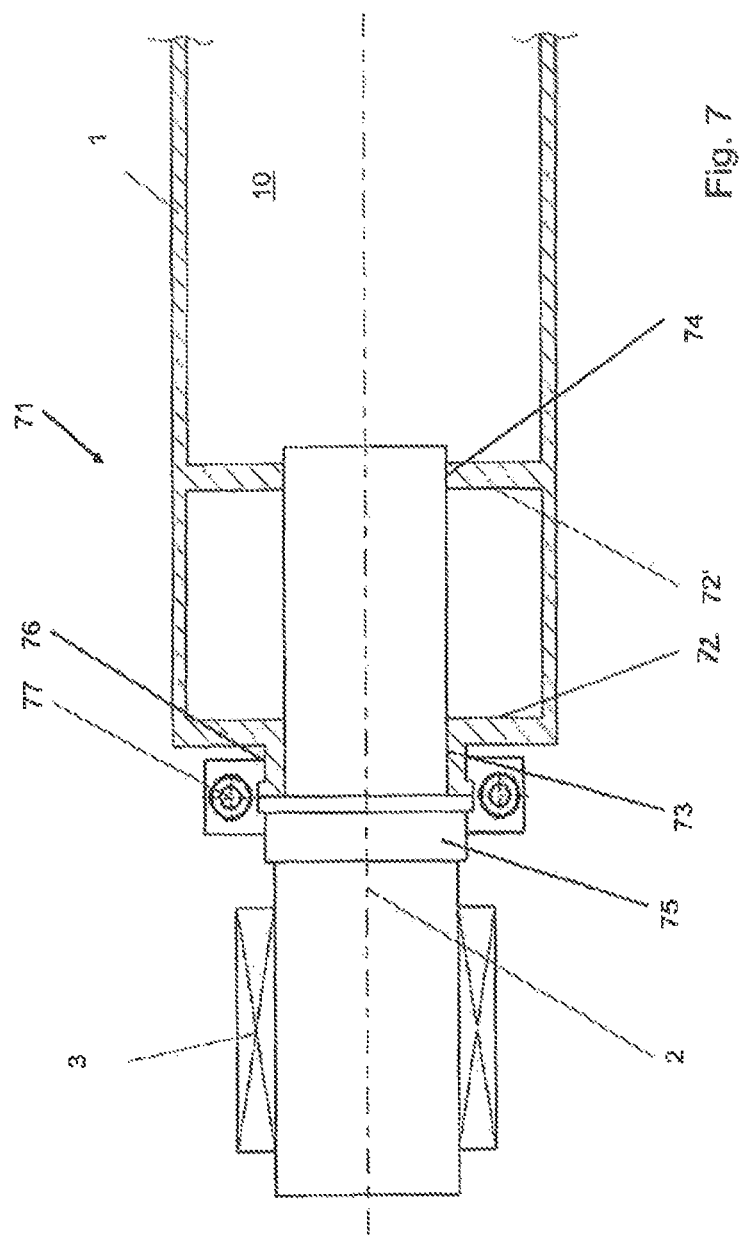

ROTOR BLADE FOR A TURBINE

RELATED APPLICATION

This is a U.S. National Phase of PCT/EP2013/000125 filed 17 Jan. 2013, which designated the U.S and claims priority to Austrian application no. A 62/2012 filed 20 Jan. 2012, the entirety of each of these applications are incorporated by reference.

BACKGROUND AND SUMMARY OF INVENTION

The present invention relates to a rotor blade for a turbine, where the rotor blade (1) has a cavity (10). Turbines of this type include wind turbines, ocean current turbines, and tidal current turbines.

At the base, i.e. at the connection to the turbine hub, the rotor blades are exposed to very high torques, which requires very large and expensive flanged connections, also in order to guarantee the necessary stiffness. Flange connections of this kind are known from WO 2010/084320 A2 or WO 2011/077454, for example. Thus, the contour of the blade must also be adapted to these geometrical dimensions and cannot be optimized for energy generation. In addition, there are blades or vanes that are cast or welded onto the hub, such as the ship's propeller in U.S. Pat. No. 3,310,116. In addition, WO 2002/42638 A1 shows a turbine blade with an internal cavity, where the blade is made up of two halves, and one half is provided with stays or ribs. There is no connection between the journal and these ribs.

The invention is thus characterized in that the rotor blade has a cavity and at least two ribs at its lower end, where a journal is provided for connecting to the hub of a turbine rotor that is inserted through an exactly fitting opening in the bottommost rib into the lower end of the rotor blade and reaches as far as the topmost rib, where it is inserted into a recess, and which is form-locked and/or force-locked with the ribs, where the journal has at least one cone or ledge and is connected to it with a rib in a force-locked connection. The blade thus has adequate stability, ever if the lower end has a smaller diameter, where the proportion of the total length of the rotor blade used for energy generation can be increased substantially. As a result of the firm connection between journal and rotor blade, torques can also be transferred effectively in addition to bending moments.

A favorable embodiment of the invention is characterized in that the blade is made of steel. The blade can be made much smaller as a result. It may be welded out of sheet steel, however the base can also he a casting should the situation arise.

A favorable development of the invention is characterized in that the journal is connected to at least one rib by means of at least one bolt disposed in axial direction, where it can also be connected to at least one rib by means of a bolt disposed in radial direction or a pin, respectively.

An alternative embodiment of the invention is characterized in that the journal has another cone or ledge inclined in the opposite direction to the first cone or ledge. As a result, the forces acting on the blade can be transferred favorably to the journal and, subsequently, to the hub.

If, preferably, a retaining ring is provided that can be joined in a form-locked connection to the other cone or ledge, the blade can be secured in place easily and the forces transferred.

A development according to the invention is characterized in that tie rods connected to at least one rib are provided. In this way, the fastening devices can be pre-assembled easily, resulting in shorter assembly times on site. It is especially favorable if the journal is joined to the at least two ribs in a force-locked connection by pre-stressing the tie rods.

As an alternative, the journal can end in a twin-fit with the at least two ribs, and be held in place in a form-locked and force-locked connection by means of a clamping ring.

The invention also relates to a turbine, especially a tidal current turbine with at least two, preferably three, rotor blades set up as described above. A stable rotor blade is needed especially for tidal current turbines, where the rotor blade according to the invention has the advantage of good conversion of energy within a very small space. Several blades may also be provided. The steel design, in particular, provides a compact and stable construction for tidal current turbines or run-of-river turbines.

SUMMARY OF THE DRAWINGS

The invention is now described on the basis of examples shown in the drawings, where:

FIG. 7 shows another variant according to the invention for the connection between journal and blade.

DETAILED DESCRIPTION OF THE INVENTION

Figure 1:
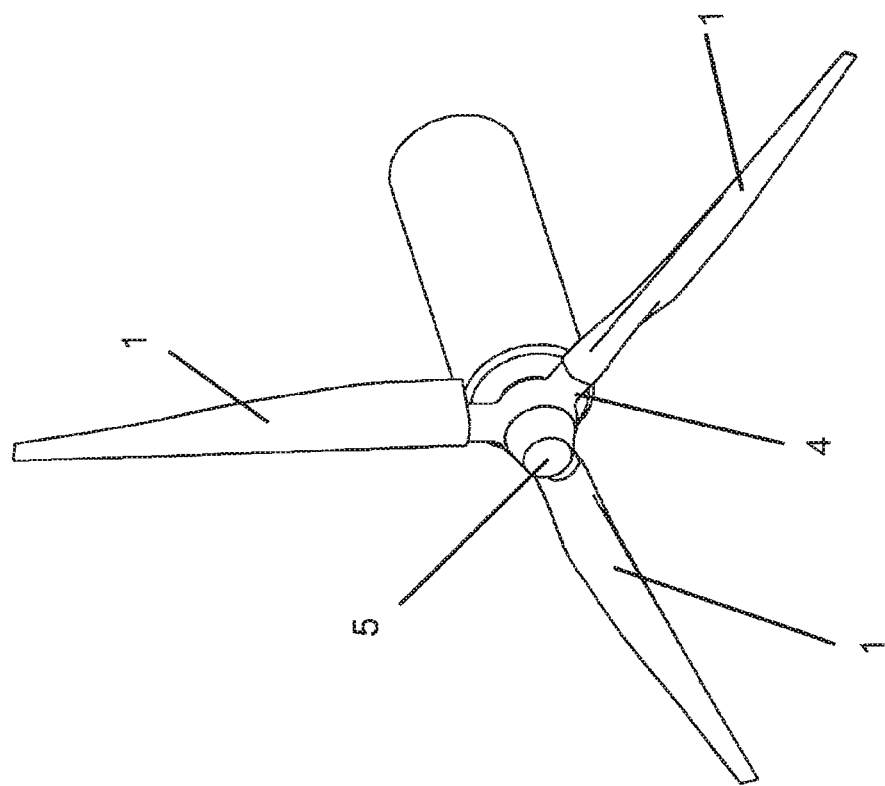
FIG. 1 shows an arrangement for a turbine according to the invention.

FIG. 1 shows an arrangement for a turbine as is used to utilize energy from tidal currents. This turbine has, for example, three rotor blades 1, which are connected to the shaft 5 via hub 4. However, two, four, or more blades can also be used.

Figure 2:
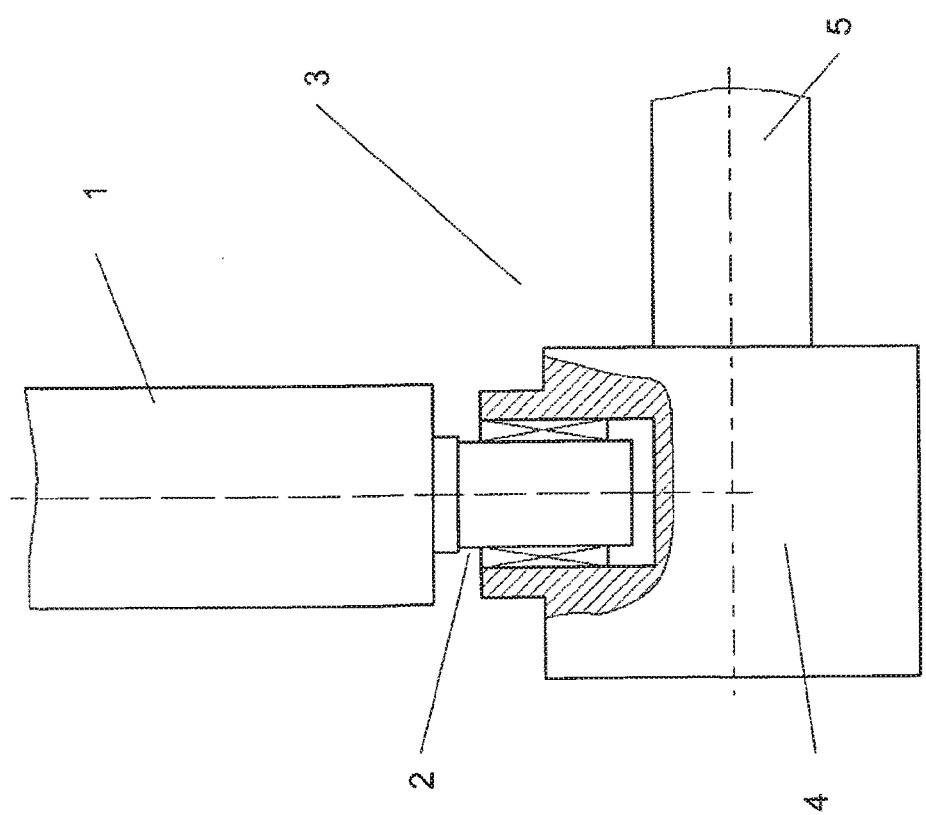
FIG. 2 shows the connection of a blade to the shaft.

FIG. 2 shows how a rotor blade 1 is connected to the shaft 5. Here, the journal 2 of the rotor blade 1 is secured via a bearing or other fastening 3 in the hub 4, which is connected permanently to the shaft. Here, devices may be provided that can be used to rotate the rotor blade in the current for optimum energy generation.

Figure 3:
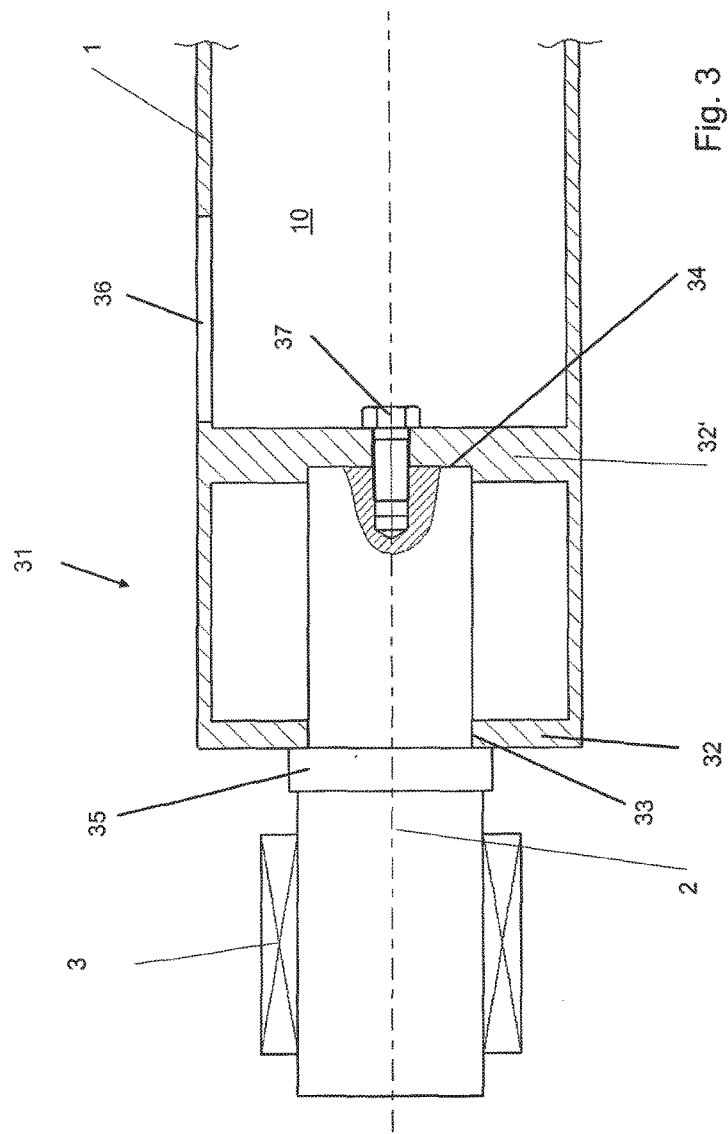
FIG. 3 shows a first variant for the connection between the journal and the blade.

FIG. 3 now shows a variant according to the invention of the connection between the journal 2 and the rotor blade 1. The lower end 31 of the rotor blade 1 contains power transmission elements, which are shaped as ribs 32, 32', in the cavity 10. The journal 2 is inserted through an exactly fitting opening 33 in the bottommost rib 32 into the lower end 31 of the rotor blade 1 and reaches as far as the topmost rib 32', where it is inserted into a recess 34. Other ribs each with openings analogous to opening 33 can be disposed between the bottommost rib 32 and the topmost rib 32'. The journal 2 also has a limit stop 35, which ends flush with the bottommost rib 32 on the outside as soon as the journal 2 has been fully inserted into the recess 34. A bolt 37 is inserted through an opening 36 in the lower end 31 of the rotor blade and secured in the axle of the journal 2. Several bolts disposed in axial direction can also be inserted, e.g. arranged in a kind of bolt circle. As a result, the bottommost rib 32 and the topmost rib 32' are clamped together and, in this way, can effectively transfer the forces occurring, especially the torsional forces.

Figure 4:
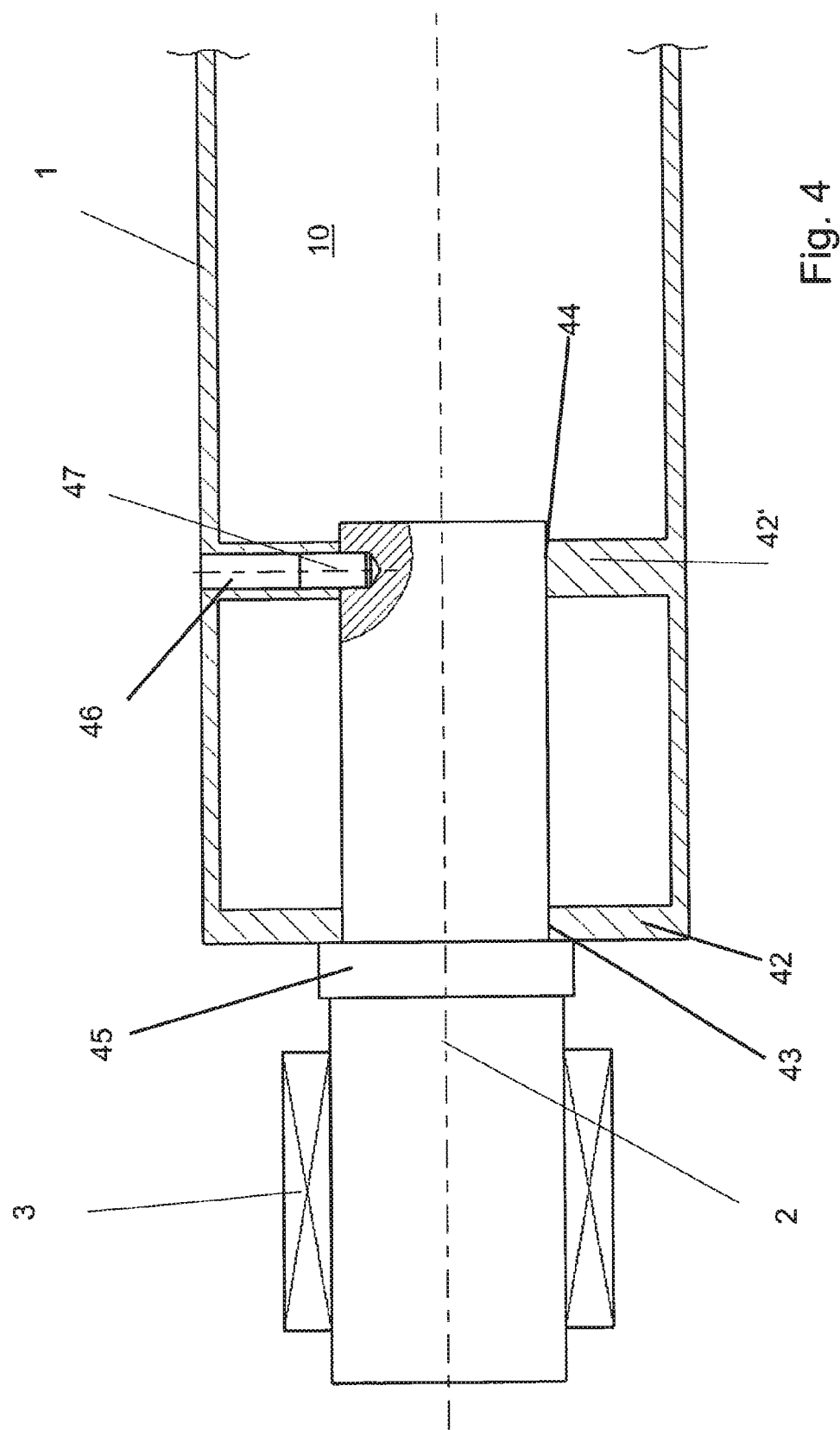
FIG. 4 shows another variant for the connection between the journal and the blade.

FIG. 4 shows an arrangement of a rotor blade 1 analogous to FIG. 3, where power transmission elements shaped as ribs 42, 42' are located in the cavity 10 in the lower end 41 of the rotor blade 1. The journal 2 is inserted through an exactly fitting opening 43 in the bottommost rib 42 into the lower end 41 of the rotor blade 1 and extends as far as the topmost rib 42', where it is inserted through an opening 44. Other ribs each with openings analogous to opening 43 can also be disposed here between the bottommost rib 42 and the topmost rib 42'. The journal 2 also has a limit stop 45 that ends flush with the bottommost rib 42 on the outside as soon as the journal 2 extends through the opening 44 in the topmost rib 42'. A stud bolt 47 is inserted through one or several holes 46 distributed round the circumference in the lower end of the rotor blade 1 and screwed tight in the journal 2. Of course, it would also be possible to insert several stud bolts 47 distributed around the circumference. As a result, the bending moments and torques can be transferred effectively.

Figure 5:
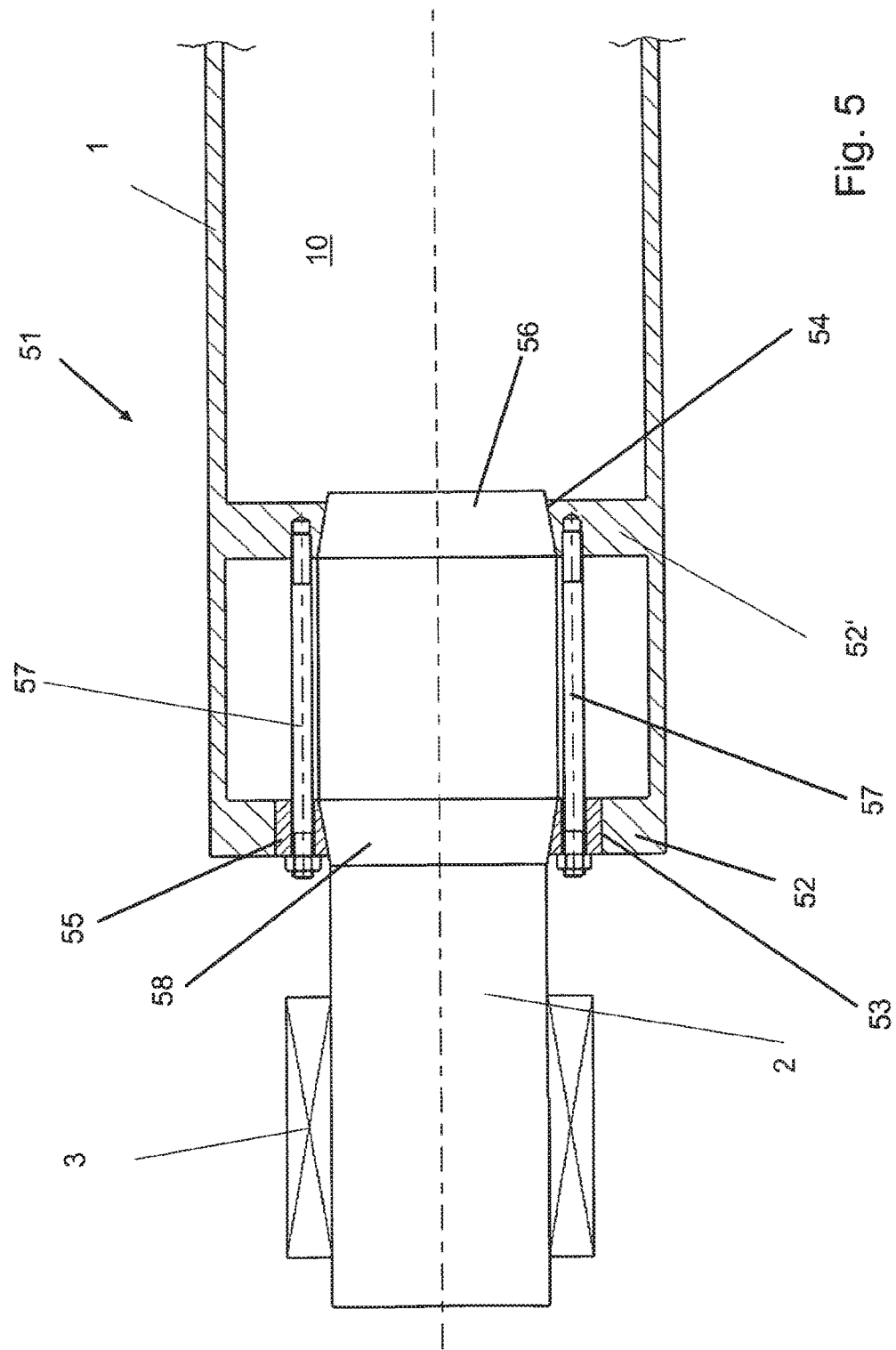
FIG. 5 shows another variant according to the invention for the connection between the journal and the blade, FIGS. 6a, b, c show assembly of the journal according to the variant in FIG. 5.

FIG. 5 shows another variant according to the invention of the connection between the journal 2 and the rotor blade 1. Here, too, there are power transmission elements shaped as ribs 52, 52' in the lower end 51 in the cavity 10 of the rotor blade 1, where additional ribs can also be inserted. The journal 2 has two cone-shaped areas 56 and 58 here. The top area 56 of the journal 2 fits exactly into the likewise conical opening 54 in the topmost rib 52' here. The lower cone-shaped area 58 of the journal 2 is also adapted to the likewise conical retaining ring 55, which is fitted into the opening 53 of the bottom rib 52, where a joint can be provided between retaining ring 55 and opening 53 to facilitate assembly work. The retaining ring 55 is now pressed against the top rib 52' by means of tie rods 57. It is an advantage if the top conical area 56 of the journal 2 has a flat angle so that it is self-locking and can absorb the torques and axial forces occurring. The lower conical area 58 of the journal 2 advantageously has a steep angle, which makes disassembly easier. With this fastening variant, the journal can be manufactured at low cost, and there are also no notches of any kind creating weak spots, e.g. feather keyways or transverse holes. The force can he transmitted to the rotor blade 1 through at least two ribs 52, 52', and this makes a leaner blade structure possible.

Figure 6C:
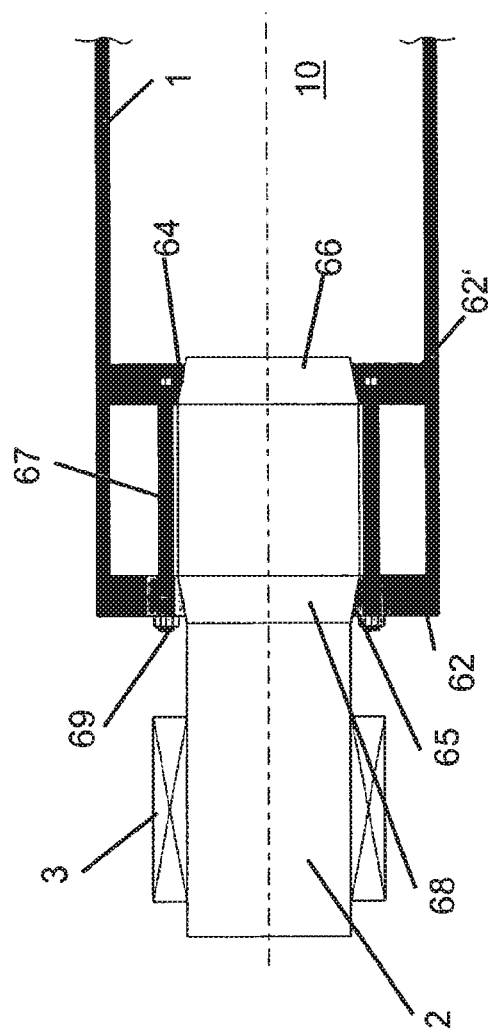
FIG. 6d shows a variant of the embodiment according to FIGS. 6a, b, c.

FIGS. 6a, 6b, and 6c now show the assembly process for a connection according to the invention between journal 2 and rotor blade 1 as shown in FIG. 5. First of all, a one-piece retaining ring 65 is pushed onto a journal 2 with an upper conical area 66 and lower conical area 68, and then the journal bearing 3 is mounted. (FIG. 6a)

On the other side, tie rods 67 are pre-assembled in the top rib 62' of the rotor blade 1. Subsequently, the journal 2 pre-assembled with the retaining ring 65 is inserted through the opening 63 in the bottommost rib 62 until its top conical area 66 latches into place towards the cavity 10 in the opening 64 in the topmost rib 62'. (FIG. 6b)

Subsequently, the tie rods 67 push the retaining ring 65 until it latches into the opening 63 in the bottommost rib 62 and is resting on the lower conical part 68 of the journal 2. After this, the retaining ring 65 is bolted to the tie rods 67 via nuts 69 and, as a result, the two conical areas 66, 68 of the journal 2 are clamped to the bottommost rib 62 and the topmost rib 62' such that power transmission is achieved free of clearance. (FIG. 6c)

FIG. 6d now shows a variant of the embodiment according to FIGS. 6a, 6b, 6c. Instead of an upper and lower conical area, one ledge each 66' and 68', respectively, i.e. a step, is provided here, where the journal 2 between the two ledges 66' and 68' has a larger diameter than the remaining journal shaft and is joined to the ribs 62, 62' of the blade 1 in a force-locked connection by means of the tie rods 67.

FIG. 7 now shows another variant of a connection according to the invention between journal 2 and rotor blade 1, where two ribs 72, 72' are again shown at the lower end 71 of the rotor blade, whereby several ribs could also be provided here. The bottommost rib 72 here has a flange 76, which forms an opening 73 for the journal 2. The outermost rib 72' has an opening 74 for the journal 2.

In addition, the limit stop 75 of the journal 2 also has a flange-like edge. A clamping ring 77, which is one-piece, but can also be two-piece, is now mounted round the two flanges. This likewise joins the journal 2 to the rotor blade 1 in such a way that it can effectively absorb the torques and axial forces arising.

The invention claimed is:

1. A rotor blade and journal assembly for a turbine comprising:
    a cavity within the rotor blade and having an opening at a radially inner end of the rotor blade, at least two ribs at a lower end region of the blade, and each of the at least two ribs extending into the cavity, and
    a journal is configured to connect to a hub of a turbine rotor and is inserted through an exactly fitting opening in a bottommost rib of the at least two ribs at the lower end of the rotor blade and reaches as far as a topmost rib of the at least two ribs,
    wherein the journal is form-locked and/or force-locked with the at least two ribs,
    wherein the journal includes at least one frustoconical section or at least one ledge and is connected to the at least two ribs in a force-locked connection,
    wherein the journal is connected to at least one of the at least two ribs by at least one bolt disposed in an axial direction.

2. The rotor blade and journal assembly according to claim 1, wherein the rotor blade is made of steel.

3. A turbine comprising at least two of the rotor blade and journal assemblies according to claim 1.

4. A rotor blade and journal assembly for a turbine comprising:
    a cavity within the rotor blade and having an opening at a radially inner end of the rotor blade, at least two ribs at a lower end region of the blade, and each of the at least two ribs extending into the cavity, and
    a journal is configured to connect to a hub of a turbine rotor and is inserted through an exactly fitting opening in a bottommost rib of the at least two ribs at the lower end of the rotor blade and reaches as far as a topmost rib of the at least two ribs,
    wherein the journal is form-locked and/or force-locked with the at least two ribs,
    wherein the journal includes at least one frustoconical section or at least one ledge and is connected to the at least two ribs in a force-locked connection, and
    wherein the journal is connected to at least one of the at least two ribs by at least one bolt disposed in a radial direction or a pin.

5. The rotor blade and journal assembly according to claim 4 wherein the rotor blade is made of steel.

6. A turbine comprising at least two of the rotor blade and journal assemblies according to claim 4.

7. A rotor blade and journal assembly for a turbine comprising:
   a cavity within the rotor blade and having an opening at a radially inner end of the rotor blade, at least two ribs at a lower end region of the blade, and each of the at least two ribs extending into the cavity, and
   a journal is configured to connect to a hub of a turbine rotor and is inserted through an exactly fitting opening in a bottommost rib of the at least two ribs at the lower end of the rotor blade and reaches as far as a topmost rib of the at least two ribs,
   wherein the journal is form-locked and/or force-locked with the at least two ribs,
   wherein the journal includes at least one frustoconical section or at least one ledge and is connected to the at least two ribs in a force-locked connection, and
   wherein the journal includes another frustoconical section or another ledge,
wherein the frustoconical sections are inclined in opposite directions.

8. The rotor blade and journal assembly according to claim 7, further comprising a retaining ring configured to be joined in a form-locked connection to the another frustoconical section or the another ledge.

9. The rotor blade and journal assembly according to claim 7 wherein the rotor blade is made of steel.

10. A turbine comprising at least two of the rotor blade and journal assemblies according to claim 7.

11. A rotor blade and journal assembly for a turbine comprising:
   a cavity within the rotor blade and having an opening at a radially inner end of the rotor blade, at least two ribs at a lower end region of the blade, and each of the at least two ribs extending into the cavity,
   tie rods connected to at least one of the at least two ribs, and
   a journal is configured to connect to a hub of a turbine rotor and is inserted through an exactly fitting opening in a bottommost rib of the at least two ribs at the lower end of the rotor blade and reaches as far as a topmost rib of the at least two ribs,
   where the journal is form-locked and/or force-locked with the at least two ribs, and
   wherein the journal includes at least one frustoconical section or at least one ledge and is connected to the at least two ribs in a force-locked connection.

12. The rotor blade and journal assembly according to claim 11, wherein the journal is joined to the at least two ribs in a force-locked connection which includes pre-stressing the tie rods.

13. The rotor blade and journal assembly according to claim 11 wherein the rotor blade is made of steel.

14. A turbine comprising at least two of the rotor blade and journal assemblies according to claim 11.

* * * * *